United States Patent
Nakagawa et al.

(10) Patent No.: US 7,364,401 B2
(45) Date of Patent: Apr. 29, 2008

(54) METHOD FOR MANUFACTURING VARIABLE-THROAT EXHAUST TURBOCHARGER AND CONSTITUENT MEMBERS OF VARIABLE THROAT-AREA MECHANISM

(75) Inventors: Hiroshi Nakagawa, Sagamihara (JP); Yasuaki Jinnai, Sagamihara (JP); Isamu Inamura, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 195 days.

(21) Appl. No.: 11/350,108

(22) Filed: Feb. 9, 2006

(65) Prior Publication Data

US 2006/0179838 A1    Aug. 17, 2006

(30) Foreign Application Priority Data

Feb. 10, 2005   (JP)   ............................. 2005-035309

(51) Int. Cl.
   *F01D 17/16*   (2006.01)
(52) U.S. Cl. .................. 415/164; 415/165; 415/186
(58) Field of Classification Search ............. 415/159, 415/165, 166, 185, 186
   See application file for complete search history.

(56) References Cited

U.S. PATENT DOCUMENTS 7,001,142 B2 *   2/2006   Knauer et al. ............... 415/165

FOREIGN PATENT DOCUMENTS

| JP | 59-78983 | 5/1984 |
| JP | 9-112511 | 5/1997 |
| JP | 2002-38967 | 2/2002 |

* cited by examiner

*Primary Examiner*—Richard A. Edgar
(74) *Attorney, Agent, or Firm*—Wenderoth, Lind & Ponack, L.L.P.

(57) ABSTRACT

The present invention provides a variable-throat exhaust turbocharger equipped with a variable-throat mechanism of which connection of constituent members can be achieved with a small number of man-hour and at low cost and which is stable in quality with firm connection of constituent members maintained under severe operating conditions. Among constituent members of the variable throat-area mechanism of the variable-throat exhaust turbocharger for varying the blade angle of a plurality of nozzle vanes supported rotatably by a members in a turbine casing, shaft members to be inserted and fixed in through-holes in a member with through-holes are produced by a method in which wear-resistant material is welded to form cladding of a certain thickness on the upper surface of a steel plate, said material being harder than the steel plate, and then crude shafts for forming drive pins are cut out from the clad plate.

8 Claims, 7 Drawing Sheets

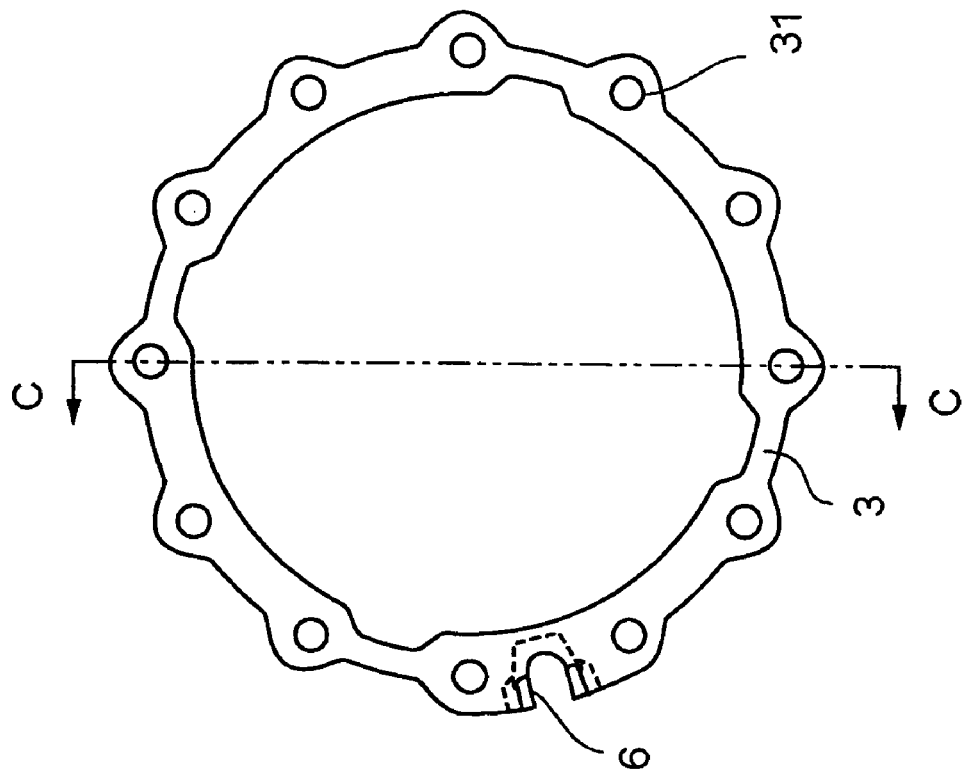
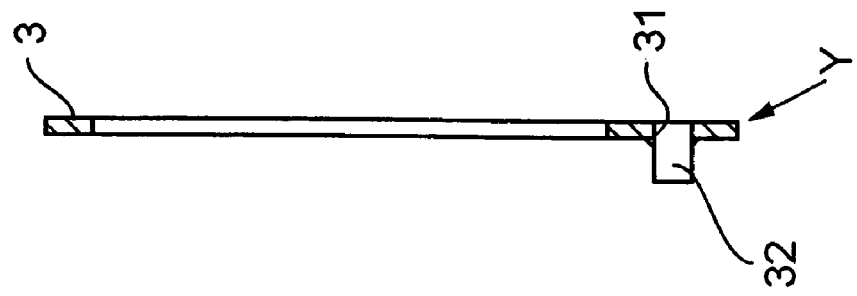

METHOD FOR MANUFACTURING VARIABLE-THROAT EXHAUST TURBOCHARGER AND CONSTITUENT MEMBERS OF VARIABLE THROAT-AREA MECHANISM

BACKGROUND OF THE INVENTION

1. Field of the Invention

The present invention relates to a method for manufacturing a variable-throat exhaust turbocharger of an internal combustion engine having a nozzle throat area varying mechanism to vary the blade angle of a plurality of nozzle vanes rotatably supported by a member in a turbine casing and a method for manufacturing constituent members of the nozzle throat area varying mechanism (hereafter referred to as variable-throat mechanism).

2. Description of the Related Art

In variable throat exhaust turbochargers of internal combustion engine for vehicles, it is necessary to reduce wear of sliding surfaces of link members of variable-throat mechanism which operate under high temperature and non-lubricated condition for an extended period, and it is required to adopt wear-resistant material higher in wear resistant property than that of conventionally used material for sliding members or surface-treat the sliding part to increase wear resistance.

Generally, material having high hardness in high temperature such as tungsten base, nickel base, or cobalt base alloy, or ceramics is used as highly wear-resistant material.

On the other hand, the member to which said sliding members are fixed is generally made of stainless steel for ease of plastic forming such as press work. However, said wear-resistant material used for the sliding members is very hard and brittle, so plastic deformation such as caulking can not be applied to fix the sliding members by caulking to the member to which said sliding member is to be fixed as is done conventionally.

Generally, press-in or shrinkage fit is adopted for firm connection of two members. However, temperature of constituent members of the variable-throat mechanism reaches 600° C. or over, so when thermal expansion coefficient of the drive pin is smaller than that of the drive ring, enough interference can not be maintained at the pressed-in part under such a high temperature, and the drive pin slips off. To prevent this, fixing of the drive pins as shown in FIG. 7, 8 has been adopted conventionally. FIGS. 7 represent the connection of a drive ring with drive pins in prior art, (A) is a front view, and (B) is a sectional view in the direction of arrows Z-Z in FIG. 7(A). FIG. 8 is a sectional view showing in detail the part surrounded by the circle V in FIG. 7(B). In FIGS. 7 and FIG. 8, a drive pin 032 made of wear-resistant material is inserted into a through-hole 31 in a drive ring 3 made of steel material such as stainless steel, then the end 032*c* thereof is welded to be fixed to the drive ring 3. Reference numeral 032 is a portion to be engaged with a lever plate not shown in the drawings.

Further, firm fixing of the drive pin to the drive ring by caulking is disclosed in Japanese Laid-Open Patent Application NO. 9-112511 (hereafter referred to as patent literature 1).

According to the disclosure, a plurality of notch grooves are provided on the inner periphery of a through hole, and an end of a shaft inserted into the through-hole is plastically deformed by caulking so that the deformed parts of the outer periphery intrude into the notched grooves to function as locking claws to prevent rotation of the shaft.

In the field of small exhaust turbochargers used for internal combustion engines for vehicles, an exhaust turbocharger is disclosed in Japanese Laid-Open Patent Application No. 59-78983 (hereafter referred to as patent literature 2), which is composed such that an exhaust turbine rotor made of ceramic material which operates under high temperature and the compressor made of metal which operates under low temperature are connected by brazing welding.

In this exhaust turbocharger, the end portion of the shaft part of the ceramic turbine rotor is tapered, and a tapering hole is provided in the metal compressor wheel to be engaged tightly with said tapering portion of the turbine rotor, whereby depressed portions are provided on the surface of one or both of the tapering shaft portion and tapering hole so that the tapering shaft portion is connected with the tapering hole by the medium of solder which fills the depressions. By this, highly accurate connection between the ceramic material and metal material is realized, and rigidity of connection between the ceramic turbine rotor and metal compressor wheel is increased by mediacy of solder.

In the field of exhaust turbochargers, particularly small ones used for an internal combustion engines for vehicles, a variable-throat exhaust turbocharger equipped with a variable-throat turbine with which flow rate of exhaust gas entering the turbine rotor through the scroll of the turbine casing can be varied in accordance with operating conditions of the engine in order that the exhaust gas flow matches the optimal operation condition of the turbocharger, has spread widely in recent years.

In the variable-throat turbocharger like this, among the constituent members of the variable-throat mechanism to vary the blade angle of a plurality of the nozzle vanes, drive pins to be engaged with lever plates, each of the lever plates being connected to the nozzle vanes by the medium of each of nozzle shafts, are fixed to a drive ring as shown in FIG. 7, 8 or as disclosed in patent literature 1.

With prior art as shown in FIGS. 7 and 8, there occurs a problem that when highly wear-resistant metal material is used for the drive pin 032, the material is very sensitive against crack when welding and yield rate is decreased. Therefore, when welding such a drive pin 032 to a drive ring made of steel material such as austenite type stainless steel, stable quality and reliability of a member consisting of a drive ring with drive pins fixed thereto can not be secured, and manufacturing cost increases due to low yield rate of fixing processing of the drive pins to the drive ring.

The method disclosed in patent literature 1 cannot be applied when the drive pins are made of wear-resistant metal material.

Although there has been proposed in patent literature 2 as mentioned above a method of connecting a ceramic turbine rotor to a compressor wheel made of metal by brazing welding as a method of connecting constituent members of an exhaust turbocharger, however, this connecting method includes problems as described hereunder, so it can not be applied to connecting constituent members of a variable throat-area mechanism.

The method of connecting by brazing welding proposed in patent literature 2 is applied to connecting a compressor wheel to a turbine rotor to which high torque is loaded under high temperature, and depressions are provided on the surface of the tapering portion of the turbine rotor shaft and on the surface of the tapering hole of the compressor wheel to fill solder therein. In case that the solder is filled imperfectly in the depressions, fracture may occur at this part.

Therefore, in this method of connecting the turbine rotor to the compressor wheel, it is necessary that the brazing welding in the range of depressions is uniform and reliable, and it will take a good deal of processing hours to connect the turbine rotor to the compressor wheel by brazing welding.

Further, in the method of connecting the turbine rotor to compressor wheel, it is difficult to confirm infiltration and spreading of the solder to the far side range of the depression toward the bottom of the hole in the compressor wheel. So, it is difficult to detect defects in the connection, and stable quality of the turbocharger cannot be maintained.

Therefore, the method of connecting by mean of brazing welding of patent literature 2 is not applicable to connecting constituent members of a variable-throat mechanism.

Further, there is a proposal to make a core part of the drive pin 032 with steel or sintered material and coat the surface of sliding part with wear-resistant material by plasma spraying or the like, however, in the case of a small part such as a drive pin 032, 90% of wear-resistant material scatters away and fly loss of the material is large.

SUMMARY OF THE INVENTION

The present invention was made in the light of above mentioned problems, and the object is to provide a variable-throat exhaust turbocharger equipped with a variable-throat mechanism of which connection of constituent members can be achieved with a small number of man-hour and at low cost and which is stable in quality with firm connection of constituent members maintained under severe operating conditions.

To attain the object, the present invention proposes a method for manufacturing constituent members of the variable throat-area mechanism of a variable-throat exhaust turbocharger for varying the blade angle of a plurality of nozzle vanes supported rotatably by a member in a turbine casing, wherein, for producing shaft members to be inserted and fixed in through-holes in a member with through-holes among constituent members of said variable throat-area mechanism, wear-resistant material is welded on the upper surface of a steel plate to form cladding of a certain thickness, said material being harder than the steel plate, and then crude shaft members are cut out from the clad plate.

By applying the method of the invention, a variable-throat exhaust turbocharger equipped with a variable throat-area mechanism for varying the blade angle of a plurality of nozzle vanes supported rotatably by a member in a turbine casing is provided in which firm connection of drive pins pressed into through-holes in a drive ring among constituent members of said variable throat-area mechanism is performed by caulking, whereby said drive pin is formed to be composed of two stratums of a wear-resistant shaft portion stratum of hard material and a connecting shaft portion stratum of material less in hardness than said wear-resistant material by forming said wear-resistant shaft portion by cladding welding on an end of said connecting shaft portion in the axial direction thereof, said connecting shaft portion is pressed into the through-hole and caulked at the end thereof for firm connection, and said wear-resistant shaft portion functions as a sliding part to be engaged with a mating member which is connected slidably to the drive pin.

In the invention, it is preferable that said wear-resistant shaft portion is made of Co—Mo alloy and said connecting shaft portion is made of steel including stainless steel and carbon steel.

Hard and wear-resistant material preferably such as Co—Mo alloy suitable for drive pins of the variable-throat mechanism is difficult to be caulked for firm fixing to another member.

According to the invention, by welding wear-resistant material on the upper surface of a steel plate less in hardness than said wear-resistant material to form cladding of a certain thickness thereon and cutting out crude shaft members preferably by electric discharge machining, a shaft member such as said drive pin composed of two stratums consisting of a shaft-shaped stratum of wear-resistant material preferably Co—Mo alloy formed to extend axially from a shaft-shaped stratum of steel such as stainless steel or carbon steel can be obtained.

Therefore, a shaft member with a wear-resistant stratum of such as Co—Mo alloy suitable for the drive pin as its sliding part can be fixed firmly to a member with through-holes such as a drive ring by inserting the shaft-shaped stratum of steel into the trough-hole and caulking the end thereof.

Further, according to the invention, the shaft member such as the drive pin can be fixed firmly to the member with holes such as the drive ring by caulking without applying heat locally to members such as the drive pin and drive ring as is done in the case of prior art of fixing the drive pin by welding, as a result deformation due to locally applying heat can be evaded.

Further, by performing firm connection of the shaft member to the member with holes by caulking, it is not necessary to take a measure to reduce the influence of deformation of the member with holes such as the drive ring due to local heating, so the thickness of the member with holes such as the drive ring can be reduced.

Further, according to the invention, by using material the same as that of the member with holes for the connecting shaft portion of the shaft member, thermal expansion coefficient does not differ at the connecting part, so firm connection can be maintained even only by press-in connection even if constituent members of the variable-throat mechanism operates under high temperature conditions.

Also, according to the invention, firm connection of the shaft member such as the drive pins to the member with holes such as the drive ring can be performed by the same method irrespective of the material of wear-resisting shaft portion by composing the shaft member such as the drive pin to be of two-stratum construction.

Further, as the shaft member such as the drive pin is composed such that expensive material such as Co—Mo alloy is used only for the portion necessary to be wear resistant and cheaper steel material is used for the portion to be connected to the member with holes, the amount of usage of expensive wear-resistant material can be reduced, and increase in cost for manufacturing the variable-throat mechanism can be suppressed.

Further, as the shaft member is obtained from the crude shaft material obtained by cladding or padding to a certain thickness by welding wear-resistant material on the upper surface of a steel plate and cutting out the crude shaft material by electric discharge machining, the number of drive pins obtained per unit quantity of expensive wear-resistant material increases and wear-resistant material is used sparingly compared to coating of wear-resistant material by plasma jet welding.

Further, the invention proposes a method for manufacturing constituent members of the variable throat-area mechanism of a variable-throat exhaust turbocharger for varying the blade angle of a plurality of nozzle vanes supported rotatably by a member in a turbine casing, wherein, for producing a shaft member to be inserted and fixed in a through-hole in a member with through-holes among constituent members of said variable throat-area mechanism, an end side of a connecting shaft is pressed into the hollow of a hollow cylinder formed of sintered material to obtain a shaft member composed of two stratums of a wear-resistant stratum and a connecting shaft stratum, the connecting shaft being less in hardness than said cylinder of sintered material, then the connecting shaft part of said shaft member is pressed into the through-hole and caulked at the end thereof for firm connection.

By applying the method of the invention, a variable-throat exhaust turbocharger equipped with a variable throat-area mechanism for varying the blade angle of a plurality of nozzle vanes supported rotatably by a member in a turbine casing is provided in which firm connection of drive pins pressed into through-holes in a drive ring among constituent members of said variable throat-area mechanism is performed by caulking, whereby said drive pin is formed to be composed of two stratums of a wear-resistant stratum of hard material and a connecting shaft stratum of material less in hardness than said wear-resistant material by pressing-in part of the connecting shaft into the hollow of a hollow cylinder formed of hard material, said connecting shaft is pressed into the through-hole of the drive ring and caulked at the end thereof for firm connection, and said wear-resistant stratum functions as a sliding part to be engaged with a mating member which is connected slidably to the drive pin.

In the invention, it is preferable that said wear-resistant stratum is made of sintered material and said connecting shaft member is made of any one of steel including stainless steel and carbon steel or sintered material.

According to the invention, degree of freedom concerning the profile of the shaft member such as the drive pin can be increased, yield rate of material can be increased by decreased pads, or decreased excessive material, and ease of machining is attained. Further, by using steel material such as stainless steel for the connecting shaft member, the amount of usage of expensive wear-resistant material can be reduced.

By using sintered material formed into a hollow cylinder for the wear-resistant portion of the drive pin 32, the wear-resistant portion of appropriate thickness can be formed around the center shaft made of steel, and the shaft member such as the drive pin can be composed to provide a match to operation conditions.

By using sintered material for the sliding portion of the shaft member such as the drive pin, degree of freedom in its profile is high, yield rate of material is increased, and manufacturing cost is reduced.

Further, it is possible to determining the thickness of the wear-resistant portion made of sintered material so that the thickness is appropriate depending on the load exerting to the variable-throat mechanism, and material cost of the shaft member such as the drive pin can be suppressed to low.

Further, the invention proposed a method for manufacturing constituent members of the variable throat-area mechanism of a variable-throat exhaust turbocharger for varying the blade angle of a plurality of nozzle vanes supported rotatably by a members in a turbine casing, wherein, for producing a shaft member to be inserted and fixed in a through-hole in a member with through-holes among constituent members of said variable throat-area mechanism, a wear-resistant shaft made of hard material and a connecting shaft are joined together at an end of each shaft by any one of friction welding or diffusion pressure welding to obtain a shaft member composed of two stratums of a wear-resistant shaft stratum and a connecting shaft stratum, then the connecting shaft part of said shaft member is pressed into the through-hole and caulked at the end thereof for firm connection.

By applying the method of the invention, a variable-throat exhaust turbocharger equipped with a variable throat-area mechanism for varying the blade angle of a plurality of nozzle vanes supported rotatably by a member in a turbine casing is provided in which firm connection of drive pins pressed into through-holes in a drive ring among constituent members of said variable throat-area mechanism is performed by caulking, whereby said drive pin is formed to be composed of two stratums of a wear-resistant shaft stratum of hard material and a connecting shaft stratum of material less in hardness than said wear-resistant material by pressure-welding a wear-resistant shaft made of hard material to a connecting shaft at an end of each shaft, the connecting shaft part is pressed into the through-hole of the drive ring and caulked at the end thereof for firm connection, and said wear-resistant shaft part functions as a sliding part to be engaged with a mating member which is connected slidably to the drive pin.

According to the invention, as the wear-resistant shaft made of hard material and the connecting shaft are joined together by any one of friction welding or diffusion pressure welding to be formed into the shaft member of two stratums extending axially, the wear-resistant member which is difficult to caulk can be connected firmly to the member with holes such as the drive ring made of steel material by the medium of the connecting shaft part made of mild steel material which can be caulked easily.

According to the invention, the wear-resistant shaft made of nickel base or cobalt base alloy and the connecting shaft made of steel can be joined together firmly by friction welding or diffusion pressure welding which are popularly practiced welding method.

By friction welding or diffusion pressure welding, materials which are difficult to be applied to cladding welding or sintering can be joined together firmly to austenite type stainless steel material which can be easily deformed plastically.

Two different material, i.e. the wear-resistant shaft and the connecting steel shaft can be firmly joined together by friction welding or diffusion pressure welding, so the constituent member of the variable-throat mechanism can be produced by popularly practiced processing without the need for using special technical processing such as cladding welding or powder metallurgy.

According to the invention, the shaft member with wear-resistant portion such as Co—Mo alloy which is high in hardness, high in wear resistance, and suitable for the drive pin can be fixed firmly by caulking to the member with holes such as the drive ring by inserting the connecting shaft portion of the shaft member composed of two stratums of a stratum of wear-resistant material portion and a stratum of connecting shaft portion made of steel material such as stainless steel or carbon steel and caulking the end of the connecting shaft portion.

In this manner, firm connection of constituent members of a variable-throat mechanism can be achieved with a small number of man-hour and at low cost, and an exhaust turbocharger equipped with a variable-throat mechanism can be provided which is stable in quality with firm connection of constituent members maintained under severe operating conditions.

BRIEF DESCRIPTION OF THE DRAWINGS

FIGS. 2 are representations of the first embodiment of the present invention, (A) is a front view of a drive ring, and (B) is a sectional view taken along line C-C in FIG. 2(A).

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
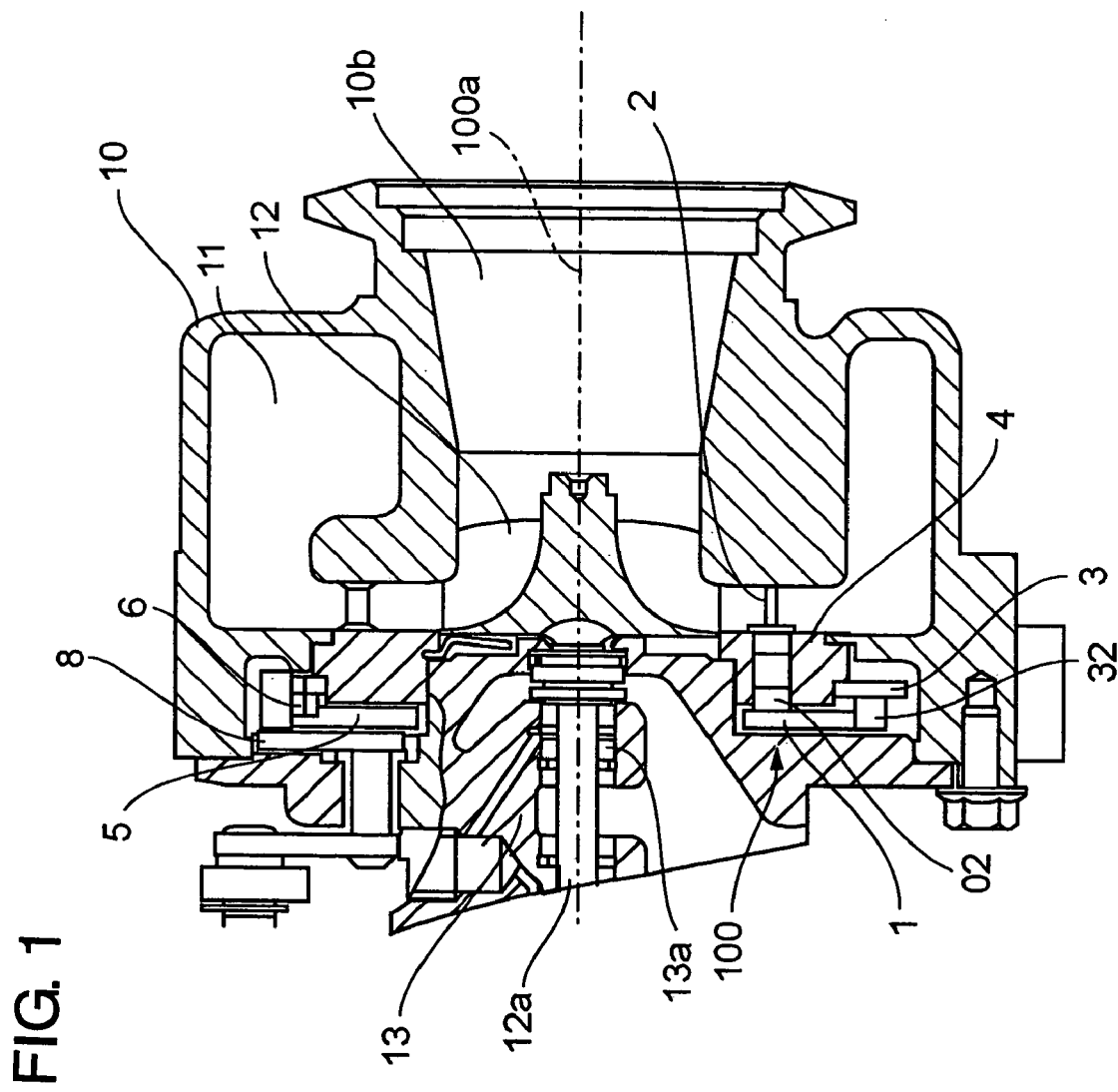
FIG. 1 is a longitudinal sectional view of relevant part of a variable-throat exhaust turbocharger equipped with a variable variable-throat mechanism according to the present invention.

FIG. 1 is a longitudinal sectional view of relevant part of a variable-throat exhaust turbocharger equipped with a variable variable-throat mechanism according to the present invention.

Referring to FIG. 1, reference numeral 10 is a turbine casing, 11 is a scroll chamber formed inside the turbine casing 10. Reference numeral 12 is a turbine rotor of radial flow type, which is connected to a compressor wheel not shown coaxially and of which the turbine shaft 12a is supported for rotation by a bearing housing 13 by means of bearings 13a. Reference numeral 100a shows the center of rotation of the exhaust turbocharger.

Reference numeral 2 is a nozzle vane, plural nozzle vanes are arranged circumferentially equally spaced in an annular flow passage for exhaust gas formed in the inner side of the scroll chamber 11, and a nozzle shaft 02 of each of the nozzle vanes is supported rotatably by a nozzle mount 4 fixed to the turbine casing 10 so that the blade angle of the nozzle vane 2 can be varied by means of a variable throat-area mechanism.

Reference numeral 3 is a drive ring formed into an annular plate and supported rotatably on a part of the periphery of the nozzle mount 4. A plurality of drive pins 32 are fixed to the drive ring 3 circumferentially equally spaced. Reference numeral 1 are lever plates each of which is engaged with the drive pin 32, the groove provided in the input side(outer side end part) thereof being engaged with drive pin 32 and the nozzle shaft 02 being fixed to the output side(center side end part) thereof.

Reference numeral 8 is a crank mechanism connected to an actuator not shown which is to drive the nozzle vanes 2, 5 is a lever connected to the crank mechanism 8, and 6 is a control sleeve which is fixed to the lever 5 and engages with the drive ring 3 to rotate the drive ring 3.

In the variable-throat exhaust turbocharger with the variable throat-area mechanism, exhaust gas of an internal combustion engine not shown entered the scroll chamber 11 then enters the annular flow passage while swirling along the convolution of the scroll chamber 11. The exhaust gas flows through the spaces between the nozzle vanes to enter the turbine rotor 12 from the periphery thereof to flow in the radial direction toward the center and flows out in the axial direction while exerting expansion work upon the turbine rotor 12. Then, the exhaust gas flowing out from the turbine rotor flows through the outlet passage 10b of the turbine casing and is exhausted outside.

When controlling exhaust gas flow through the exhaust turbine, the blade angle of the nozzle vanes 2 is determined by a blade angle control means not shown so that the flow rate of the exhaust gas flowing through the spaces between the nozzle vanes is a desired flow rate. The actuator not shown rotates the drive ring 3 to rotate the nozzle vanes 2 to the angle determined by the blade angle control means by way of the crank mechanism 8, lever 5, and control sleeve 6.

When the drive ring 3 is rotated, each lever plate 1 is swung around the center axis of each nozzle shaft 02, which is supported rotatably in the nozzle mount 4, by each of the drive pins 32 fixed to the drive ring 3 circumferentially equally spaced. By the swing of each lever plate 1, each nozzle shaft 02 fixed to each lever plate is rotated and each nozzle vane 2 integral with each nozzle shaft 02 is rotated, thus the blade angle of the nozzle vanes is varied.

The present invention relates to an improvement of the connection of the shaft members to a member with a through-hole or holes such as the connection of the drive pins to the drive ring and the connection of the control sleeve to the lever in the variable-throat exhaust turbocharger equipped with the variable throat-area mechanism composed as described above.

First Embodiment

Figure 3A:
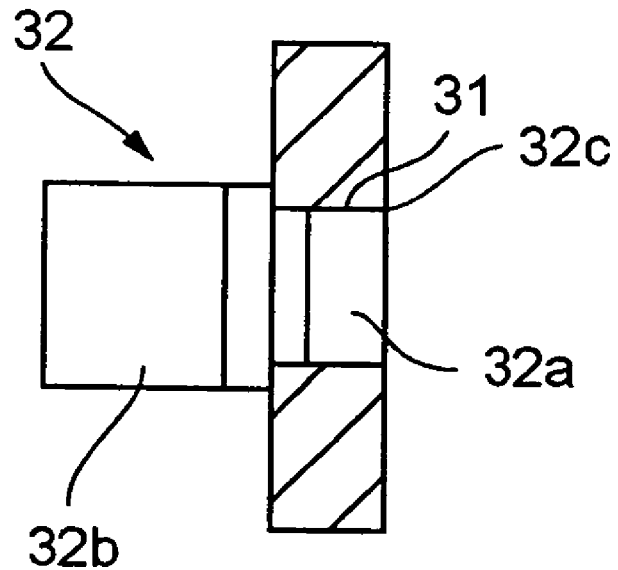
FIG. 3(A) is an enlarged sectional view showing the detail of the connecting part(corresponding to the part indicated by an arrow Y in FIG. 2(B)) of a drive pin with the drive ring of the first embodiment of the invention.
Figure 3B:
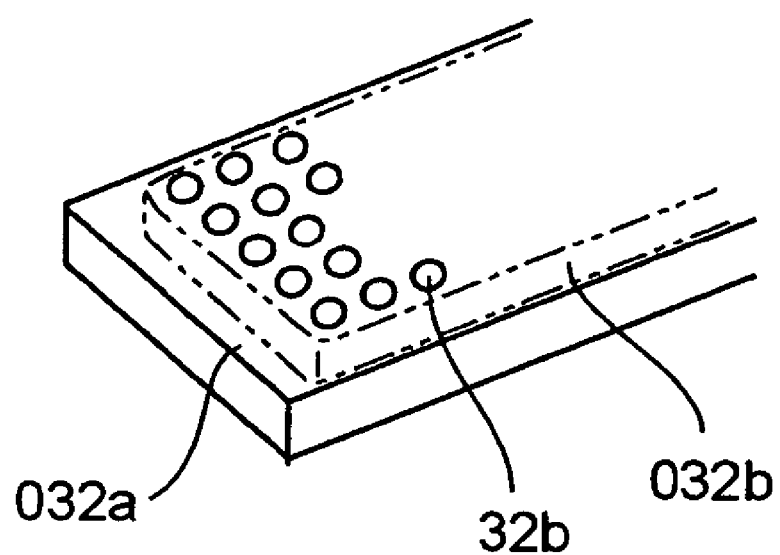
FIG. 3(B) is a perspective view showing a point how the drive pin is produced.
Figure 4:
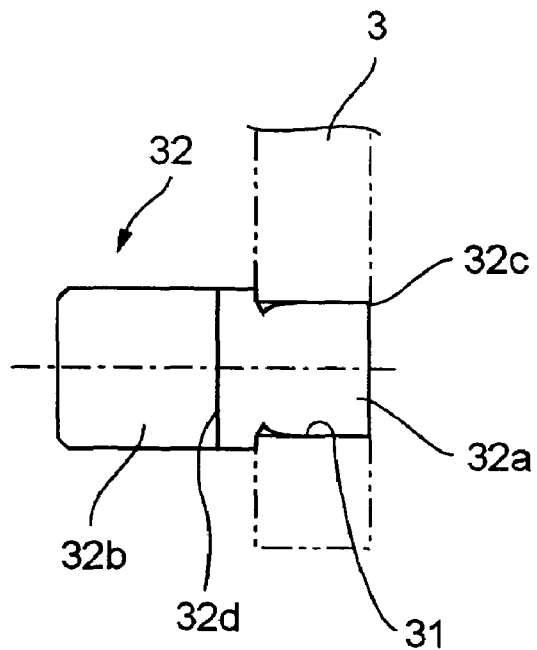
FIG. 4 is a side view of the drive pin of the first embodiment composed of two stratums.

FIGS. 2 are representations of the first embodiment of the present invention, (A) is a front view of a drive ring, and (B) is a sectional view taken along line C-C in FIG. 2(A). FIG. 3(A) is an enlarged sectional view showing the detail of the connecting part(corresponding to the part indicated by an arrow Y in FIG. 2(B)) of a drive pin with the drive ring of the first embodiment of the invention, and FIG. 3(B) is a drawing (perspective view) for explaining how the drive pin is produced. FIG. 4 is a side view of the drive pin of the first embodiment composed of two stratums.

Referring to FIG. 2-4, reference numeral 3 is the drive ring (member with holes) of the variable throat-area mechanism 100 (see FIG. 1), 31 are through-holes provided in the drive ring 3 circumferentially equally spaced into each of which the drive pin (shaft member) 32 is pressed-in and an end thereof is caulked as shown in FIG. 3(A) by reference numeral 32c.

In the first embodiment, the drive pin 32 is pressed into the through-hole 31 of the drive ring 3, both being constituent members of the variable-throat mechanism 100, and caulked at an end thereof as shown in FIG. 2(B), whereby the drive pin 32 is composed of two stratums, i.e. a wear-resistant shaft 32b and a connecting shaft portion 32a, the wear-resistant shaft portion 32b being of Co—Mo alloy (alloy of 60 wt % of Co and 20 wt % of Mo is suitable) and formed by padding or cladding by welding in the axial direction on the connecting shaft portion 32a which is made of stainless steel, and the connecting shaft portion 32a of the drive pin 32 is pressed into the through-hole 31 and caulked at the free end side thereof to secure firm fixing to the drive ring 3 as shown in FIG. 3(A) and FIG. 4. In FIG. 4, reference numeral 32d is the junction of wear-resistant shaft portion 32b and the connecting shaft portion 32a, and 32c is a caulking portion or portions.

FIG. 3 (B) is a drawing for explaining an example of how the drive pin is produced. When producing the drive pin 32, Co—Mo alloy layer 032b of a certain thickness is clad by welding on the upper surface of a stainless steel plate 032a, then crude shafts of a certain diameter for drive pins 32b are cut out from said plate clad with said alloy by electric discharge machining. Each of the crude shafts is machined to obtain the drive pin 32b composed of two stratums, i.e. a wear-resistant portion stratum 32b and a connecting portion stratum.

Wear-resistant material of cobalt base alloy such as Co—Mo alloy is generally used as welding material and it can be clad by welding with high reliability.

Highly wear-resistant metal is hard but brittle on the other hand and it is difficult to deform it plastically to fix it firmly by caulking. In the first embodiment of the present invention, stainless steel which can be easily deformed plastically is used for the connecting shaft portion of the drive pin 32, so the drive pin can be fixed firmly by caulking. In this manner, the drive pin 32 having a highly wear-resistant sliding shaft portion 32b and a connecting shaft portion 32a of stainless steel capable of being firmly fixed in the through-hole 31 of the drive ring 3 by caulking can be obtained, thus highly reliable fixing of the drive pin to the drive ring 3 can be achieved.

Further, as thermal expansion coefficient of the drive ring 3 made of austenite type stainless steel is larger than that of wear-resistant alloy of cobalt base or nickel base alloy such as Co—Mo alloy, if a drive pin made of such alloy is fixed to the drive ring 3 of austenite type stainless steel by pressing it into the through-hole 31 of the drive ring 3, the interference provided between the through-hole and the shaft under ordinary temperature is decreased and firm connection can not be maintained under high temperature. According to the invention, as the connecting shaft portion 32a to be pressed-in of the drive pin 32 is made of stainless steel which has practically the same thermal expansion coefficient as that of the drive ring 3, connecting force of the drive pin to the drive ring can be maintained even if the drive pin is merely pressed-in.

Generally 3 to 13 drive pins 32 are connected to the drive ring 3. In the case it is necessary to use wear-resistant material of cobalt base or nickel base alloy such as Co—Mo alloy in the parts where strong wear resistance is needed and ordinary heat resistant material is used in the parts where condition is not so severe, method of connection must be different depending on parts where the drive pins are connected, which complicates connection process flow.

According to the first embodiment, all of drive pins can be made to be able to be connected to all of the through-holes of the drive ring 3 by the same method, by using for the sliding portion 32a of the drive pins material similar to that of the member to which the drive pins are to be connected, even if wear-resistant material is used for the wear-resistant shaft portion 32b.

Further, cobalt base or nickel base wear-resistant alloy such as Co—Mo alloy is very expensive. In the first embodiment, such an expensive material is used only for the wear-resistant shaft portion 32b and the other portion such as connection shaft portion 32a can be made of inexpensive material, so increase in material cost can be suppressed.

According to the first embodiment, the drive pin 32 composed of two stratums of the wear-resistant shaft portion 32b and connecting shaft portion 32a can be obtained by cladding or padding to a certain thickness by welding wear-resistant material of Co—Mo alloy, which is suitable material for the drive pin 32 of the variable-throat mechanism 100 for its high hardness and high wear-resistance property but not capable of being caulked, on the upper surface of a stainless steel plate, cutting out crude shafts for drive pin by electric discharge machining, and finishing the crude material.

Therefore, the drive pin 32 having a wear-resistant shaft portion of Co—Mo alloy can be fixed firmly by caulking in the through-hole 31 of the drive ring 3 by inserting the connecting shaft portion 32a of the drive pin 32 (shaft member) composed of two stratums of a wear-resistant shaft portion stratum 32b of Co—Mo alloy and a connecting shaft portion stratum 32a of stainless steel into the through-hole 31 of the drive ring 3 and caulking at the free end side of the connecting shaft portion 32a.

According to the first embodiment, the drive pin 32 can be fixed firmly to the drive ring 3 by caulking without applying heat locally to the connecting members as is done in the case of prior art of fixing the drive pin by welding, as a result deformation due to locally applying heat can be evaded.

Further, by performing firm connection of the drive pin 32 to the drive ring 3 by caulking, it is not necessary to take a measure to reduce the influence of deformation of the drive ring 3 due to local heating, so the thickness of the drive ring 3 can be reduced resulting in reduced weight and size of the drive pin 3.

Further, according to the first embodiment, by using stainless steel similar to the drive ring 3 for the connecting shaft portion of the drive pin 32, thermal expansion coefficient does not differ at the connecting part, so firm connection can be maintained even only by press-in connection even if constituent members of the variable-throat mechanism 100 operates under high temperature conditions.

Also, according to the first embodiment, the firm connection of the drive pins 32 to the drive ring 3 can be performed by the same method irrespective of the material of wear-resisting shaft portion 32b by composing the drive pin 32 to be of two-stratum construction.

Further, as the drive pin 32 is composed such that expensive material such as Co—Mo alloy is used only for the portion necessary to be wear resistant and cheaper material such as stainless steel is used for the portion to be connected to the drive ring 3, the amount of usage of expensive wear-resistant material can be reduced, and increase in cost for manufacturing the variable-throat mechanism can be suppressed.

Further, as the drive pin 32 is produced from the crude shafts obtained by cladding or padding to a certain thickness by welding wear-resistant material 032b of Co—Mo alloy on the upper surface of a stainless steel plate 032b and cutting out the crude shafts by electric discharge machining, the number of drive pins obtained per unit quantity of expensive wear-resistant material is increased and wear-resistant material is used sparingly compared to coating of wear-resistant material by plasma jet welding.

Second Embodiment

Figure 5:
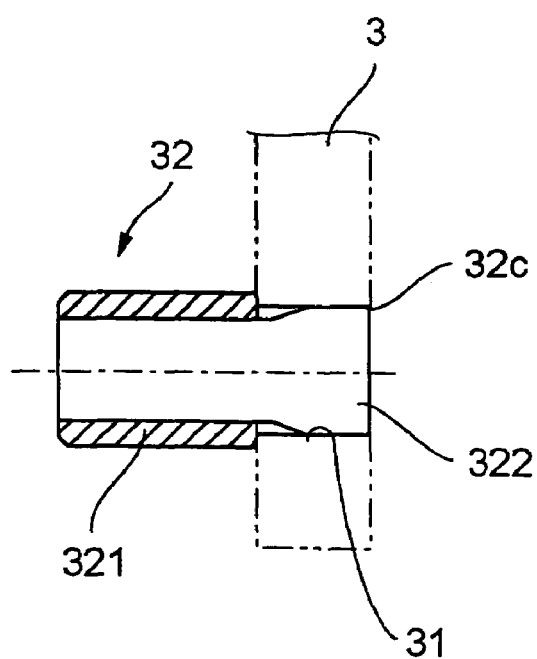
FIG. 5 is an enlarged sectional view showing the detail of the connecting part of the drive ring with the drive pin of the second embodiment of the present invention.

FIG. 5 is an enlarged sectional view showing the detail of the connecting part of the drive ring with the drive pin of the second embodiment of the present invention.

In the second embodiment, the drive pin 32 is composed of two stratums by pressing-in an end side of a center shaft 322 made of material such as stainless steel or carbon steel into a wear-resistant member 321 which is made of hard sintered material and formed into a hollow cylinder, and the other end side of the center shaft 322 of the drive pin 32 is pressed into the through-hole 31 of the drive ring 3 and caulked at the end thereof as indicated by reference numeral 32c.

Thus, the drive pin 32 is composed such that the connecting shaft portion of the center shaft 322 is pressed into the through-hole 31 of the drive ring 3 and caulked as indicated by 32c for firm connection and the wear-resistant member 321 functions as a sliding portion engaged with the lever plate 1 (see FIG. 1).

Besides stainless steel and carbon steel, sintered material may be used for the center shaft 322.

Although the connecting shaft portion of the center shaft 322 is inserted to the end of the through-hole 31 in FIG. 5, it is permissible that the end of the connecting shaft portion of the center shaft 322 does not reach the end of the through-hole 31.

When producing the integrated member of the drive ring 3 and drive pins 32 of the variable-throat mechanism 100 according to the second embodiment, an end side of the center shaft 322 which is smaller in diameter than that of the other end side which is the connecting shaft portion is pressing into the hollow of the wear-resistant member 321, which is made of sintered material and formed into a hollow cylinder, to be fixed in the hollow to obtain the drive pin 32 (shaft member) composed of two stratums of a wear-resistant portion 321 and a connecting shaft portion of the center shaft 322. Then the connecting shaft portion of the center shaft 322 of the drive pin 32 is pressed into the through-hole 31 and the end of the connecting shaft portion of the center shaft 322 is caulked at caulking points 32c for firm fixing.

Metal injection molding may be applied to form the wear-resistant member 321.

According to the second embodiment, degree of freedom concerning the profile of the drive pin 32 can be increased, yield rate of material can be increased by decreased pads, or excessive material, and ease of machining is attained. Further, by using steel material such as stainless steel for the center shaft 322 of the drive pin 32, the amount of usage of expensive wear-resistant material can be reduced.

By using sintered material formed into a hollow cylinder for the wear-resistant portion of the drive pin 32, the wear-resistant portion of appropriate thickness can be formed around the center shaft made of steel, and the drive pin 32 can be composed to provide a match to operation conditions.

Further, it is possible to determining the thickness of the wear-resistant portion 321 made of sintered material so that the thickness is appropriate depending on the load exerting to the variable-throat mechanism 100, and material cost of the drive pin 32 can be suppressed to low.

Third Embodiment

Figure 6:
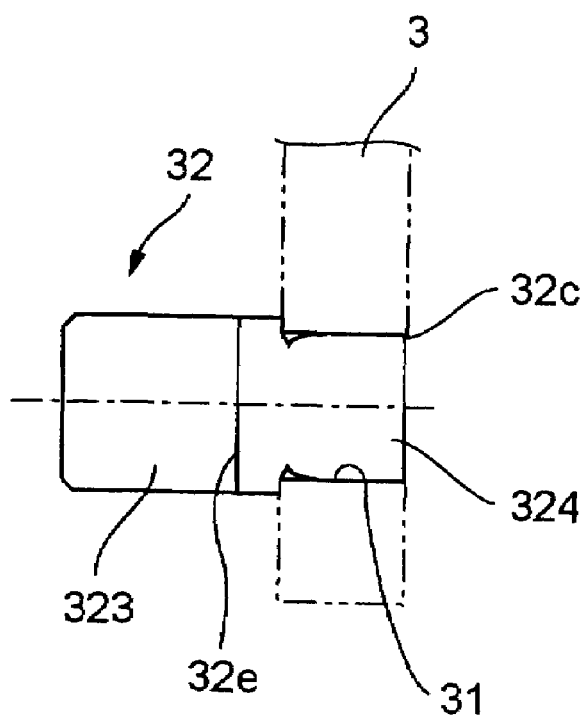
FIG. 6 is an enlarged sectional view showing the detail of the connecting part of the drive ring with the drive pin of the third embodiment of the present invention.
Figure 7A:
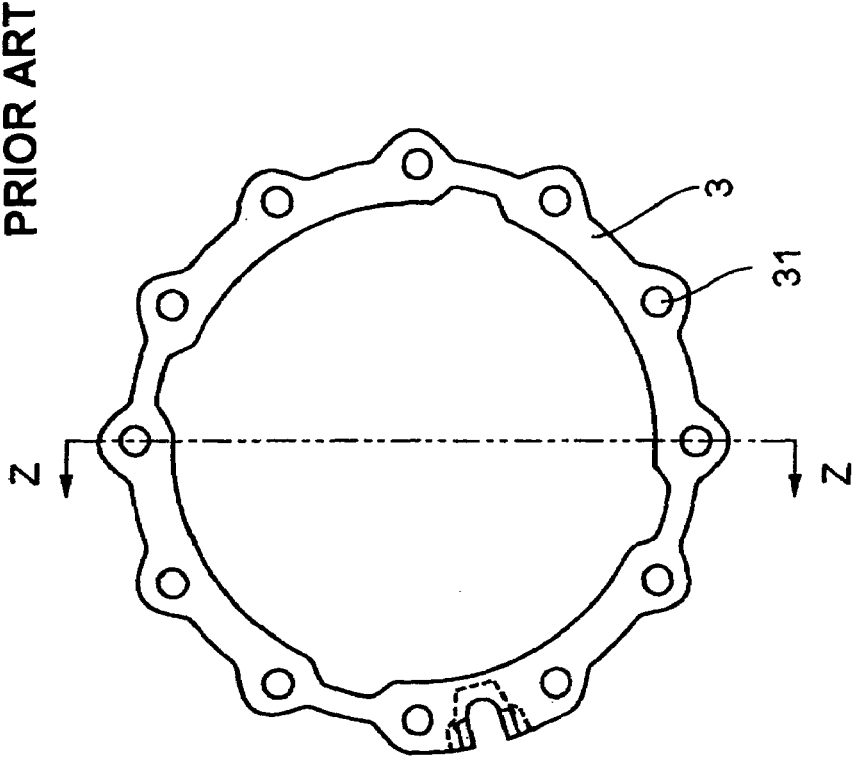
FIGS. 7 represent the connection of a drive ring with drive pins in prior art, (A) is a front view, and (B) is a sectional view in the direction of arrows Z-Z in FIG. 7(A).
Figure 7B:
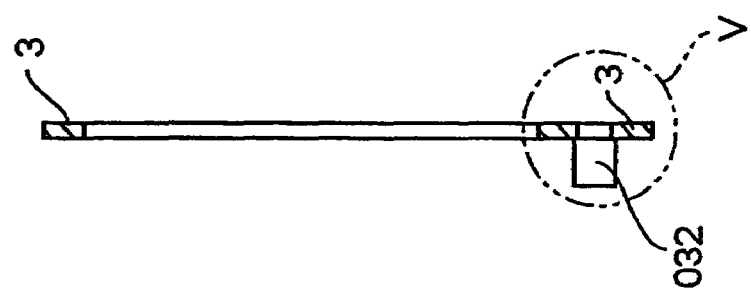
Figure 8:
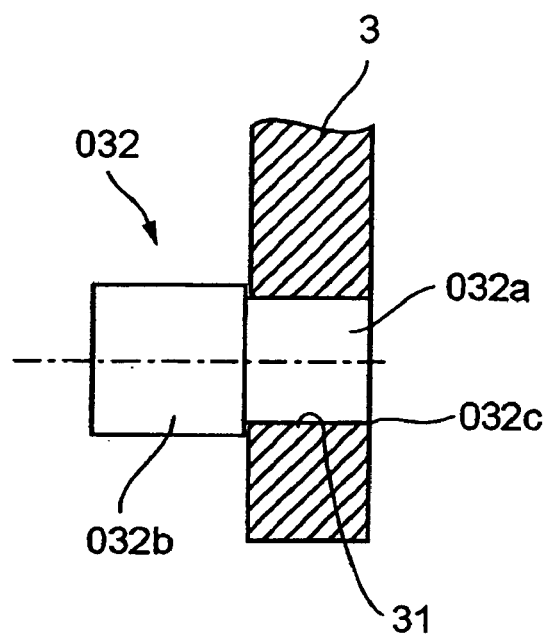
FIG. 8 is a sectional view showing in detail the part surrounded by the circle V in FIG. 7(B).

FIG. 6 is an enlarged sectional view showing the detail of the connecting part of the drive ring with the drive pin of the third embodiment of the present invention.

According to the third embodiment, the drive pin 32 is composed by pressure-welding an end of a wear-resistant shaft 323 made of hard material such as Co—Mo alloy to a connection shaft 324 made of steel material, welded end faces being indicated by reference numeral 32e. Thus, drive pin 32 composed of two stratums in axial direction is obtained.

The connection shaft 324 side is pressed into the through-hole 31 of the drive ring 3 and caulked at the end of thereof as indicated by reference numeral 32c.

Thus, the drive pin 32 is composed such that the connection shaft 324 is pressed into the through-hole 31 of the drive ring 3 and caulked as indicated by 32c for firm connection, and the wear-resistant shaft 323 functions as a sliding portion engaged with the lever plate 1 (see FIG. 1).

When producing the integrated member of the drive ring 3 and drive pins 32 of the variable-throat mechanism 100 according to the third embodiment, an end of the wear-resistant shaft 323 made of hard material such as Co—Mo alloy is friction-welded or diffusion-pressure-welded to an end of the connection shaft 324 to obtain the drive pin (shaft member) composed of two axial stratums of a wear-resistant shaft stratum 323 and a connection shaft stratum 324. The connecting shaft 324 of the drive pin 32 is pressed into the through-hole 31 of the drive ring 3 and the end of the connecting shaft 323 is caulked at caulking points 32c for firm fixing.

According to the third embodiment, as the wear-resistant shaft 323 made of hard material and the connection shaft 324 are joined together by friction welding or diffusion pressure welding to form into the drive pin 32 of two stratums extending axially, the wear-resistant shaft 323 which is difficult to caulk can be connected firmly to the drive ring 3 made of steel material by the medium of the connecting shaft 324 made of mild steel material which can be caulked easily.

The wear-resistant shaft 323 made of nickel base or cobalt base alloy such as Co—Mo alloy and the connection shaft 324 made of steel such as stainless steel can be joined together firmly by friction welding or diffusion pressure welding which are popularly practiced welding method.

According to the third embodiment, materials which are difficult to be applied to cladding welding or sintering can be connected to austenite type stainless steel which can be easily deformed plastically.

Two different material, the wear-resistant shaft 323 and the connection shaft 324, can be firmly joined together by friction welding or diffusion pressure welding, so the constituent member of the variable-throat mechanism 100 can be produced by popularly practiced processing without the need for using special technical processing such as cladding welding or powder metallurgy.

Although connection of the drive pin 32 with drive ring 3 has been explained in above embodiments, the present invention is not limited to those embodiments, it is applicable to connection of members having a through-hole or holes with shaft member or members which are inserted into the through-hole or holes among constituent members of the variable-throat mechanism 100.

According to the present invention, connection of constituent members of a variable-throat mechanism can be achieved with a small number of man-hour and at low cost, and an exhaust turbocharger equipped with a variable-throat mechanism can be provided which is stable in quality with firm connection of constituent members maintained under severe operating conditions.

The invention claimed is:

1. A method for manufacturing constituent members of a variable throat-area mechanism of a variable-throat exhaust turbocharger for varying the blade angle of a plurality of nozzle vanes supported rotatably by a member in a turbine casing, wherein, for producing shaft members to be inserted and fixed in through-holes in a member with through-holes among constituent members of said variable throat-area mechanism, wear-resistant material is welded on the upper surface of a steel plate to form cladding of a certain thickness thereon, said material being harder than the steel plate, and then crude shaft members are cut out from the clad plate.

2. A variable-throat exhaust turbocharger equipped with a variable throat-area mechanism for varying the blade angle of a plurality of nozzle vanes supported rotatably by a member in a turbine casing, wherein firm connection of drive pins pressed into through-holes in a drive ring among constituent members of said variable throat-area mechanism is performed by caulking, whereby said drive pin is formed to be composed of two stratums of a wear-resistant shaft portion stratum of hard material and a connecting shaft portion stratum of material less in hardness than said wear-resistant material by forming said wear-resistant shaft portion by cladding welding on an end of said connecting shaft portion in the axial direction thereof, said connecting shaft portion is pressed into the through-hole and caulked at the end thereof for firm connection, and said wear-resistant shaft portion functions as a sliding part to be engaged with a mating member which is connected slidably to the drive pin.

3. A variable-throat exhaust turbocharger according to claim 2, wherein said wear-resistant shaft portion is made of Co—Mo alloy and said connecting shaft portion is made of steel including stainless steel and carbon steel.

4. A method for manufacturing constituent members of a variable throat-area mechanism of a variable-throat exhaust turbocharger for varying the blade angle of a plurality of nozzle vanes supported rotatably by a members in a turbine casing, wherein, for producing a shaft member to be inserted and fixed in a through-hole in a member with through-holes among constituent members of said variable throat-area mechanism, an end side of a connecting shaft is pressed into the hollow of a hollow cylinder formed of sintered material to obtain a shaft member composed of two stratums of a wear-resistant stratum and a connecting shaft stratum, the connecting shaft being less in hardness than said cylinder of sintered material, then the connecting shaft part of said shaft member is pressed into the through-hole and caulked at the end thereof for firm connection.

5. A variable-throat exhaust turbocharger equipped with a variable throat-area mechanism for varying the blade angle of a plurality of nozzle vanes supported rotatably by a member in a turbine casing, wherein firm connection of drive pins pressed into through-holes in a drive ring among constituent members of said variable throat-area mechanism is performed by caulking, whereby said drive pin is formed to be composed of two stratums of a wear-resistant stratum of hard material and a connecting shaft stratum of material less in hardness than said wear-resistant material by pressing-in part of the connecting shaft into the hollow of a hollow cylinder formed of sintered material, said connecting shaft member is pressed into the through-hole of the drive ring and caulked at the end thereof for firm connection, and said wear-resistant stratum functions as a sliding part to be engaged with a mating member which is connected slidably to the drive pin.

6. A variable-throat exhaust turbocharger according to claim 5, wherein said wear-resistant portion is made of sintered material and said connecting shaft member is made of any one of steel including stainless steel and carbon steel or sintered material.

7. A method for manufacturing constituent members of a variable throat-area mechanism of a variable-throat exhaust turbocharger for varying the blade angle of a plurality of nozzle vanes supported rotatably by a member in a turbine casing, wherein, for producing a shaft member to be inserted and fixed in a through-hole in a member with through-holes among constituent members of said variable throat-area mechanism, a wear-resistant shaft made of hard material and a connecting shaft are joined together at an end of each shaft by any one of friction welding or diffusion pressure welding to obtain a shaft member composed of two stratums of a wear-resistant shaft stratum and a connecting shaft stratum, then the connecting shaft part of said shaft member is pressed into the through-hole and caulked at the end thereof for firm connection.

8. A variable-throat exhaust turbocharger equipped with a variable throat-area mechanism for varying the blade angle of a plurality of nozzle vanes supported rotatably by a member in a turbine casing, wherein firm connection of drive pins pressed into through-holes in a drive ring among constituent members of said variable throat-area mechanism is performed by caulking, whereby said drive pin is formed to be composed of two stratums of a wear-resistant shaft stratum of hard material and a connecting shaft stratum of material less in hardness than said wear-resistant material by pressure-welding a wear-resistant shaft made of hard material to a connecting shaft at an end of each shaft, the connecting shaft part is pressed into the through-hole of the drive ring and caulked at the end thereof for firm connection, and said wear-resistant shaft part functions as a sliding part to be engaged with a mating member which is connected slidably to the drive pin.

* * * * *